Aug. 23, 1932. F. A. KOLSTER 1,872,975
NAVIGATION SYSTEM AND METHOD
Filed June 19, 1928 5 Sheets-Sheet 4
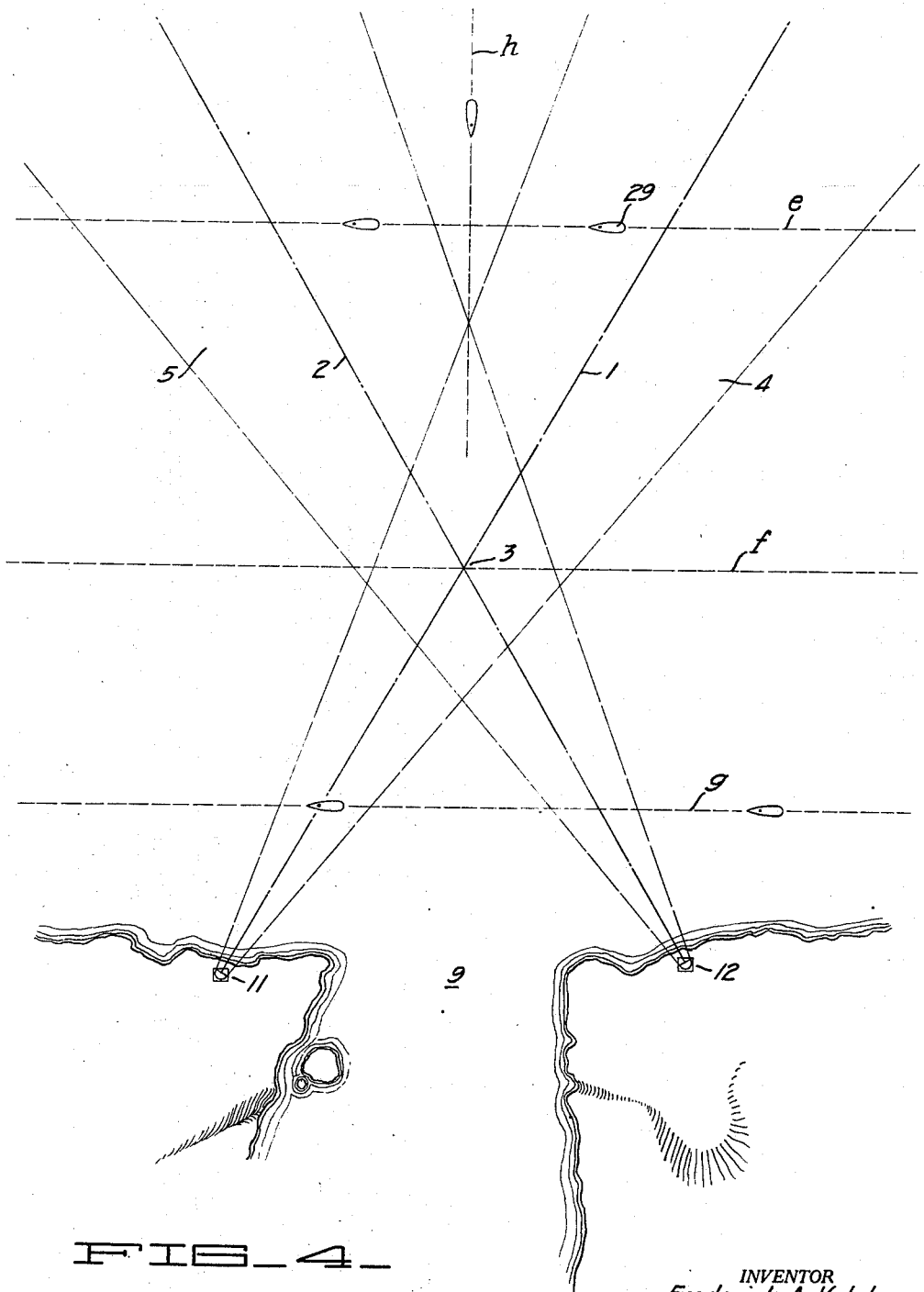
FIG_4_
INVENTOR
Frederick A. Kolster
BY
White Prost Fryer
ATTORNEYS Aug. 23, 1932.  F. A. KOLSTER  1,872,975
NAVIGATION SYSTEM AND METHOD
Filed June 19, 1928    5 Sheets-Sheet 5
FIG_5_
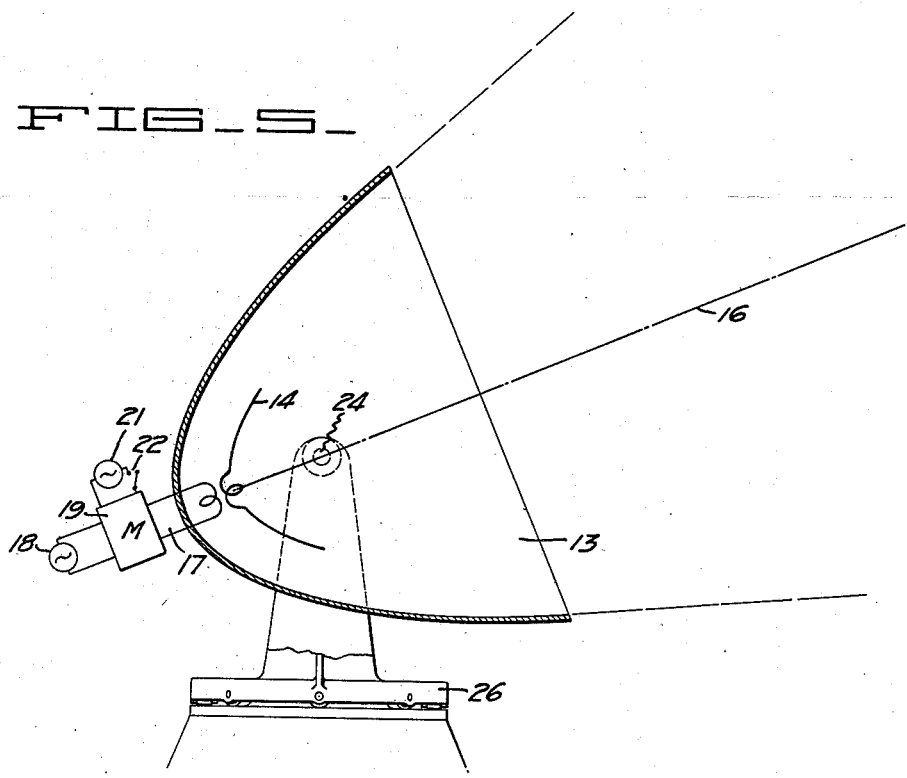
FIG_6_
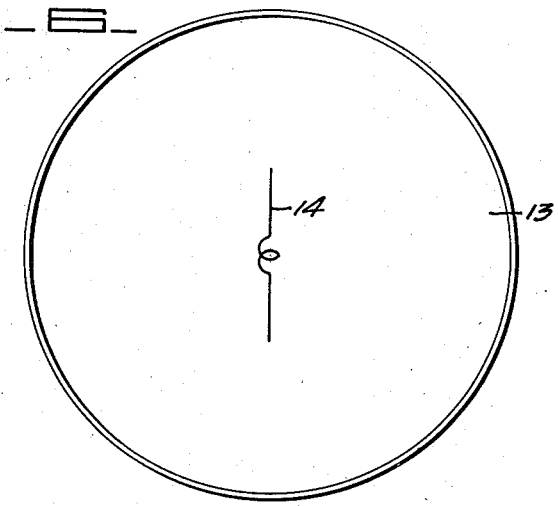
INVENTOR
Frederick A. Kolster
BY
ATTORNEYS Patented Aug. 23, 1932

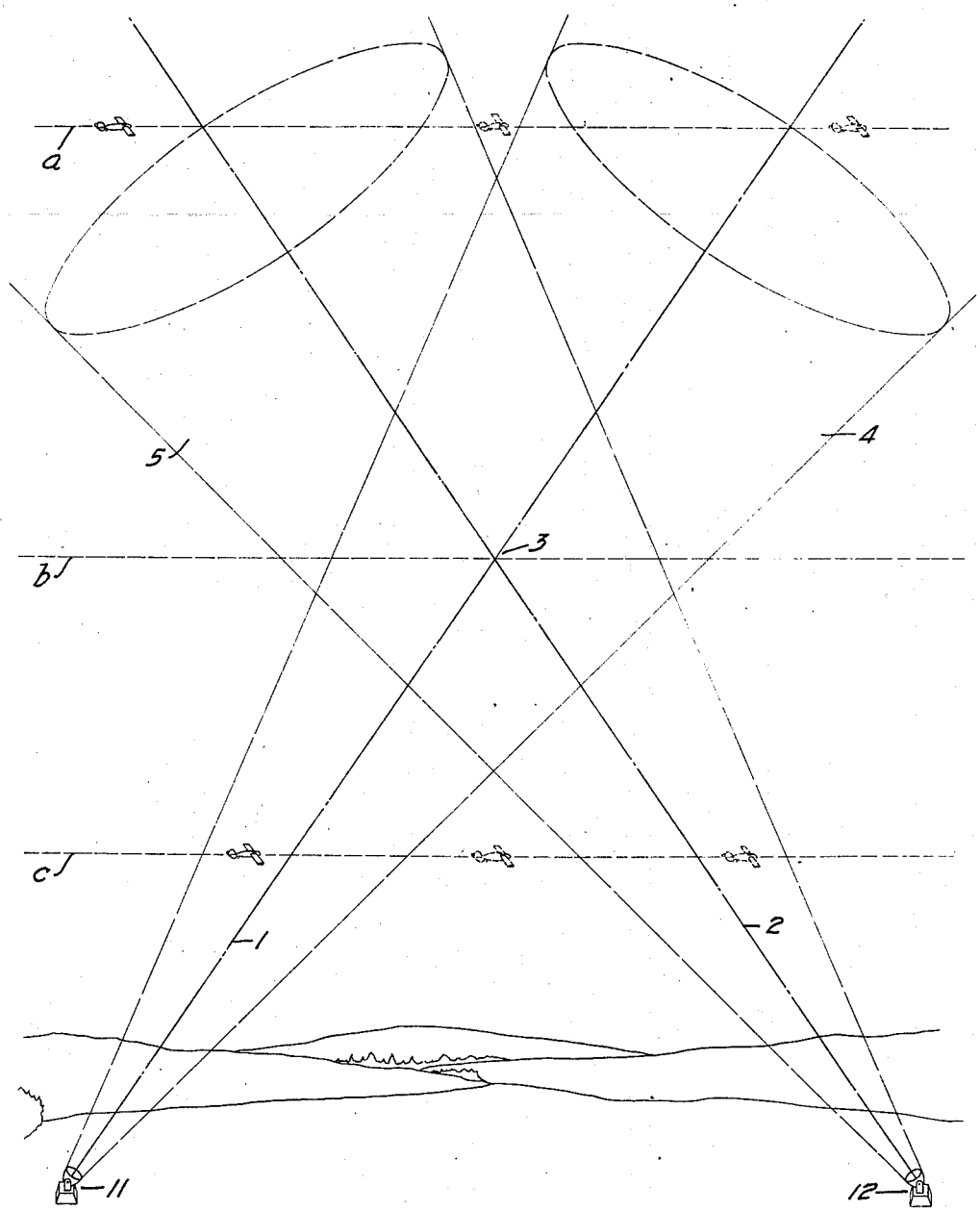
FIG_1_

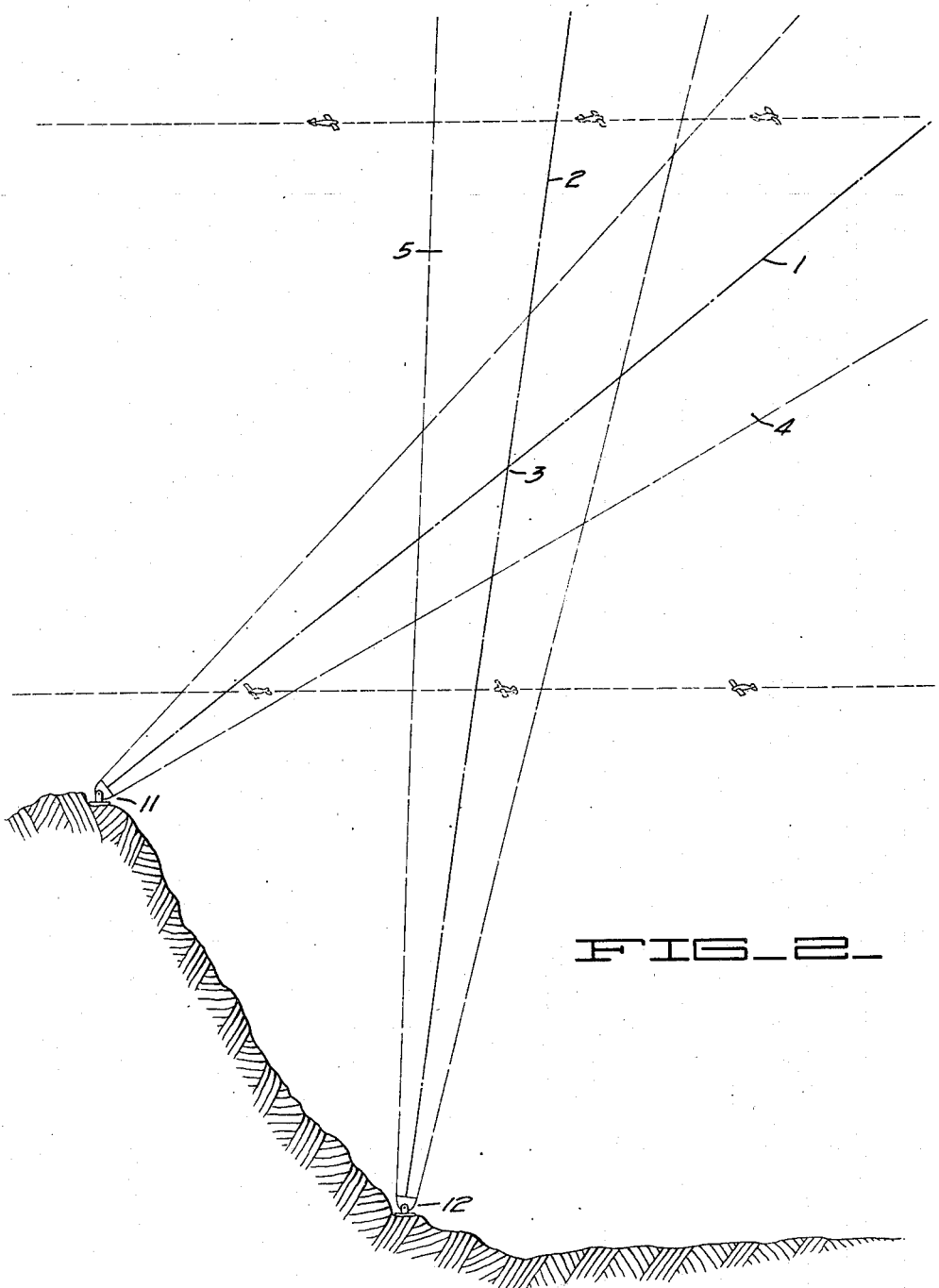

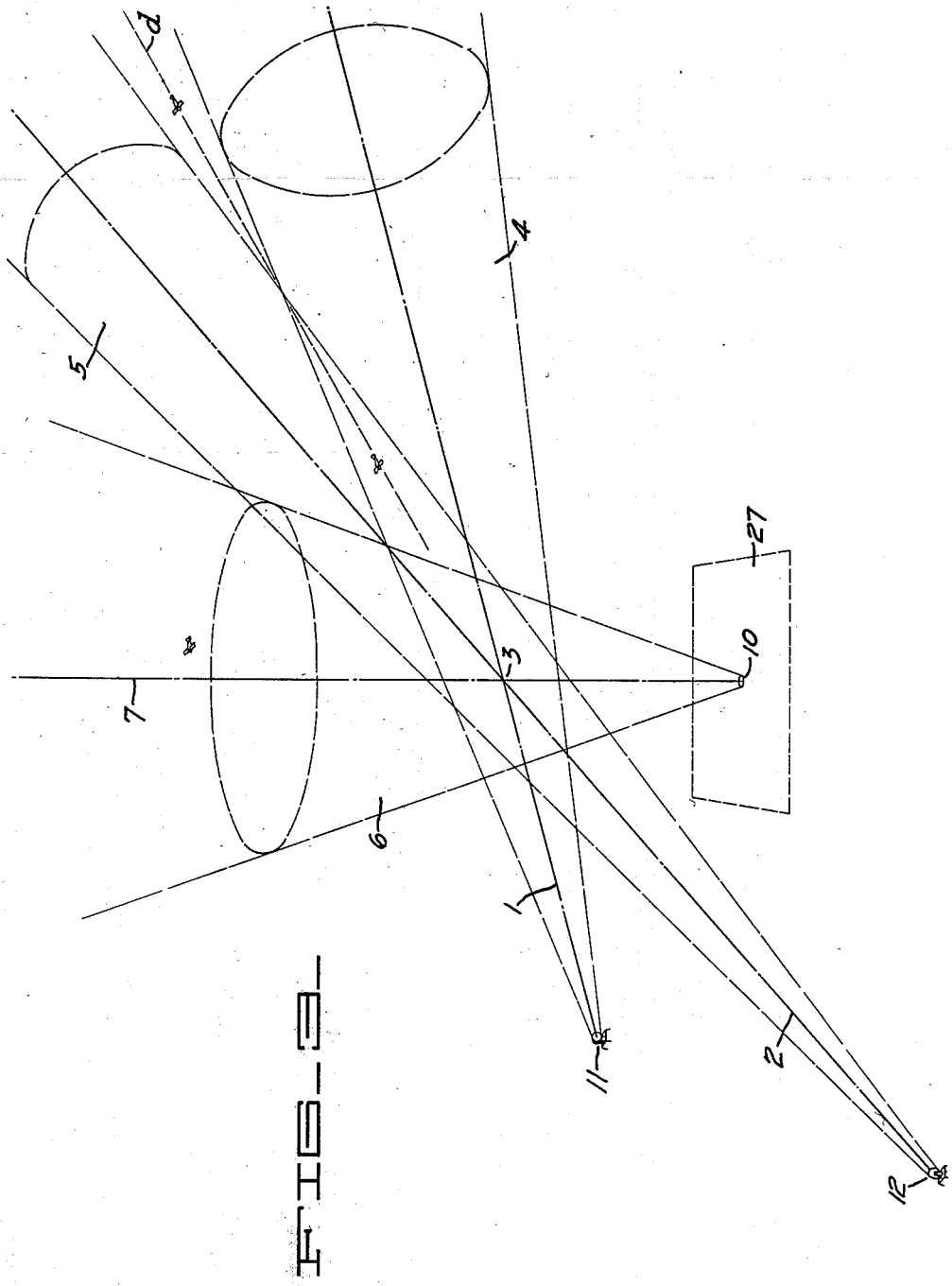

1,872,975

UNITED STATES PATENT OFFICE

FREDERICK A. KOLSTER, OF PALO ALTO, CALIFORNIA, ASSIGNOR TO FEDERAL TELEGRAPH COMPANY, OF SAN FRANCISCO, CALIFORNIA, A CORPORATION OF CALIFORNIA

NAVIGATION SYSTEM AND METHOD

Application filed June 19, 1928. Serial No. 286,697.

This invention relates generally to radio beacon systems and methods for facilitating the navigation of air or marine ships, and to apparatus capable of being employed in such systems.

An object of the invention is to produce on board a movable craft an indication showing its position irrespective of visibility conditions.

A feature of the invention is a system of radio beams intersecting in a space traversed by moving craft for indicating to navigators their elevation as well as their horizontal position.

In both marine and aerial navigation, it has been common to utilize directive radio receiving apparatus, commonly known as radio compasses, for taking direction bearings with respect to a beacon radio transmitter. While such radio compasses are comparatively accurate, they do not provide a direct method of determining the approximate distance between the navigator and the source of radiation. For aerial navigation, altitude indicating instruments are employed, but these instruments indicate the altitude from sea level rather than the height of the air ship above the ground. Instruments are also employed for determining the speed and direction of flight, but the readings of these instruments must be corrected by a draft factor, which cannot be calculated when visiblity is poor. One of the principal hazards of present day navigation, particularly aerial navigation, has therefore been due to the lack of a simple and direct method of indicating a navigator's approximate distance and position with respect to a certain known locality.

In the system and method herein described and claimed, I utilize two concentrated fields of radio energy, and by successive or simultaneous reception of energy from these two beams, a navigator can determine his approximate position with respect to a known locality.

Referring to the drawings:

Figs. 1 and 2 are perspective views illustrating my system and method, utilizing two beams of radio energy.

Fig. 3 is a perspective view illustrating an adaptation of my system and apparatus utilizing more than two concentrated beams of radiation.

Fig. 4 is a plan view illustrating how my system and method may be employed in marine navigation.

Figs. 5 and 6 are side elevational and plan views, respectively, of apparatus for producing the concentrated field of electromagnetic radiation which I prefer to employ in my system and method.

In Fig. 1 I have shown my system and method applied to aerial navigation, for which the method is particularly effective. In this case the apparatus is installed at a convenient point along a regular commercial airway. I have shown electromagnetic wave propagating means 11 and 12 located at two comparatively remote points along the surface of the earth. Each means is preferably of such a character that it forms a comparatively concentrated radiation field. For this purpose I prefer to employ wave reflecting apparatus such as shown in the copending application filed in the name of Kolster and Kruesi, Serial No. 279,244, filed May 21, 1928.

The apparatus of Fig. 5 may be described briefly as comprising an electromagnetic wave reflector 13. (Figs. 5 and 6) made of some suitable conductive material, such as wire mesh or sheet metal, and preferably in the form of a paraboloid. Positioned within the paraboloidal reflector 13 and located at the focal center, is an antenna conductor 14. Conductor 14 preferably extends upon opposite sides of and is symmetrically positioned with respect to the reflector axis 16 and has its medial portion inductively coupled to a suitable signaling circuit 17. As an example of a suitable form of signaling circuit, I have shown a carrier frequency oscillator 18 supplying oscillatory energy to a modulating device 19. Also connected to modulating device 19, there is a tone frequency oscillator 21 which can be controlled by the key or switch 22. The energy radiated by the antenna conductor 14 can be characterized by coding the signaling circuit, or by utilizing the characteristic tone frequency of oscillator 21.

The wave length of energy employed is preferably about four times the focal length of the reflector.

With apparatus such as described above a concentrated radiation field is produced. This field is not fan shaped, as is produced by other forms of apparatus, but is in the form of a true beam, that is, it is concentrated in two dimensions in a manner similar to the beam projected from a paraboloidal search light. The beam of electromagnetic radiation is practically symmetrical with respect to the reflector axis 16. In order to permit full control over the direction of propagation of the waves, reflector 13 is preferably mounted upon a pivoted shaft 24 to permit the reflector to be tilted to various angles with respect to the horizontal, and shaft 24 is in turn mounted upon platform 26 which is rotatable about a vertical axis.

Referring again to Fig. 1, lines 1 and 2 represent the directions of maximum radiation from apparatus 11 and 12. By properly directing the reflecting apparatus lines 1 and 2 may be caused to converge and intersect at point 3 located above the surface of the earth, and above this point lines 1 and 2 diverge. The radiation fields of means 11 and 12 have been indicated at 4 and 5. It is apparent that the space immediately surrounding the point of intersection 3 is characterized by the radiation fields of both the apparatus 11 and 12. At a much lower elevation however the two radiation fields are separate and convergent, and at a sufficient distance above the point of intersection 3, the two fields are separate and divergent.

If an airplane is flying at a comparatively high elevation represented by the dotted line $a$ and is proceeding from left to right, it first enters and receives radiation from the field 5, and subsequently leaves this field and enters and receives radiation from the field 4. Assuming that the radiation fields are characterized in such a manner that they can be readily distinguished by the navigator, the navigator in first receiving energy from field 5 and subsequently energy from field 4, and knowing the general direction of his course from other instruments with which he is provided, is immediately informed of his approximate distance above the elevation of the intersection 3. Assuming that the navigator is flying at a lower elevation represented by the dotted line $b$ which is substantially at the elevation of the point of intersection 3, then instead of receiving successive characteristic signals from the fields 5 and 4, the navigator receives energy from both fields 5 and 4 simultaneously. Thus upon receiving energy of this character the navigator knows immediately that he is a substantial distance above the ground but in the neighborhood of the landing field represented by the point of intersection 3. A third possible position is represented by a navigator flying at a relatively low altitude represented by the dotted line $c$. At this altitude if the plane is flying from left to right, the navigator first receives energy from the field 4 and subsequently receives from field 5. Thus since the navigator knows that if he is at a high altitude he should receive energy first from field 5 and subsequently from field 4, he is immediately informed that he is flying at a comparatively low altitude.

A number of different expedients may be employed for characterizing the fields 4 and 5. For example the fields may be of different frequencies, in which event the navigator must be supplied with receiving apparatus capable of receiving both carrier frequencies. In order to simplify the receiving apparatus, I prefer to operate both of the means 11 and 12 upon the same carrier frequency, and to modulate them differently. In addition to the possibility of modulating upon two different tone frequencies, I may modulate each transmitter by a characteristic code. If the coding of the transmitters is synchronized, they can be arranged so that when superposed in the area surrounding the point of intersection, they produce a different resultant response. For example if apparatus 11 is coded with a dot and a dash, to represent the letter A, and apparatus 12 is coded with a dash followed by a dot to represent the letter N, then if the coding of apparatus 11 and that of apparatus 12 is properly synchronized, the superposing of these signals will result in a single long dash representing the letter T, for the space surrounding the point of intersection 3.

It is apparent that the above method may be made use of in a number of different ways. When used along a regular commercial airway, I prefer that the zone of intersection of the two radiation fields be at an altitude from the surface of the earth below which the navigator cannot fly with safety.

In Fig. 2 I have shown how my method may be employed to indicate the approximate altitude of an airship approaching a mountain range. In this case if the navigator approaching the mountain received signals from fields 4 and 5 in proper sequence, he is apprised of the fact that he is at a proper altitude for safe flying. However if signals are received in the reverse sequence, then the navigator knows that he must increase his altitude for safety.

In Fig. 3 I have shown the use of more than two radiation beams for aiding a navigator. In this case wave propagating apparatus represented by apparatus 11 and 12 produces the concentrated radiation fields 4 and 5, but these fields are inclined with respect to the horizontal as shown. A third wave reflecting apparatus 10 forms an upwardly directed concentrated radiation field 6, which is arranged to intersect the fields 4 and 5 at approximately the area of intersection of these fields. Thus the line 7 representing the direction of maximum radiation of apparatus 10 is shown as intersecting lines 1 and 2 at point 3. In this case radiation fields 4 and 5 are properly characterized to be distinguishable from each other in the manner previously explained, and radiation field 6 is likewise preferably characterized to be distinguishable from the fields 4 and 5. If an aviator is flying along a course represented by the dotted line $d$ then he may be guided in his course by reception of energy from either field 4 or field 5. When he enters the influence of the radiation field 6, he may employ the reception from this field to check the direction of his course or he may be guided by energy received from this field to make a safe landing upon a landing field 27. If an aviator first enters the field 6, he may determine his course from the subsequently received energy from the fields 4 and 5.

In Fig. 4 I have shown my method applied for aiding navigation of ships. In this case the wave reflecting apparatus 11 and 12 is installed at remote points on the land and the reflectors are directed to propagate concentrated electromagnetic fields horizontally over the water. To prevent the waves from being absorbed and to keep them close to the water, the antenna conductor 14 of each apparatus should be inclined with respect to the horizontal, in order to provide both horizontally and vertically polarized components. Assuming that a ship 29 equipped with proper receiving apparatus is proceeding along the course represented by dotted line $e$, then separate radiation from fields 4 and 5 will be received successively, indicating to the navigator that he is out beyond the point of intersection 3. If the course is as represented by the dotted line $f$, then the energy from both fields will be received simultaneously, thus indicating the approximate distance from the shore. If the course is along the dotted line $g$, then the radiations from the fields 4 and 5 will be received in reverse order, thus indicating that the ship is comparatively close to land. An arrangement of this kind may also be employed for aiding a navigator to direct his ship toward a channel 9. Assuming that the course of the ship is along the dotted line $h$, then the navigator can set his course by energy received from either field 4 or 5 and when the proximity of point of intersection 3 has been reached, reception of energy from both fields apprises the navigator of his approximate position from shore and that his course is laid correctly for the channel 9.

I claim:

1. The method of indicating the position of a movable craft which comprises producing a plurality of upwardly directed beams of radio energy in a space traversed by said craft, the directions and relative positions of said beams being such that the length of any horizontal path between two of said beams is a function of the elevation of the path, producing indications on said craft in response to said beams, determining the length of the path traversed by said craft between said beams, and ascertaining therefrom the elevation of said craft.

2. The method of indicating the position of a movable craft which comprises producing a plurality of upwardly directed beams of differently characterized radio energy in a space traversed by said craft, the directions and relative positions of said beams being such that the length of any horizontal path between two of said beams is a function of the elevation of the path, producing distinctive indications on said craft in response to said differently characterized beams, determining the length of the path traversed by said craft between said beams, and ascertaining therefrom the elevation of said craft.

3. The method of indicating the position of an air craft above or below a predetermined elevation which consists in projecting differently characterized beams of radio energy from remote points, causing said beams to intersect at said predetermined elevation, traversing said beams by said air craft, receiving said beams on said air craft and noting the sequence in which said beams are received.

4. The method of indicating the elevation of an air craft which consists in projecting differently characterized beams of radio energy from spaced points on the ground, causing said beams to intersect at a predetermined elevation, traversing said beams by said air craft, receiving said beams on said air craft and producing distinctive signals therefrom, and utilizing the sequence of receipt of said waves to indicate the approximate elevation of said air craft.

In testimony whereof, I have hereunto set my hand.

FREDERICK A. KOLSTER.